US012126076B2

(12) United States Patent
Kurokawa et al.

(10) Patent No.: US 12,126,076 B2
(45) Date of Patent: Oct. 22, 2024

(54) VEHICLE SKELETON STRUCTURE

(71) Applicant: TOYOTA JIDOSHA KABUSHIKI KAISHA, Toyota (JP)

(72) Inventors: Hiroyuki Kurokawa, Nisshin (JP); Shintaro Kitakata, Nisshin (JP); Koichiro Ueno, Nagoya (JP)

(73) Assignee: TOYOTA JIDOSHA KABUSHIKI KAISHA, Toyota (JP)

( * ) Notice: Subject to any disclaimer, the term of this patent is extended or adjusted under 35 U.S.C. 154(b) by 119 days.

(21) Appl. No.: 17/989,118

(22) Filed: Nov. 17, 2022

(65) Prior Publication Data

US 2023/0170607 A1 Jun. 1, 2023

(30) Foreign Application Priority Data

Nov. 29, 2021 (JP) ................................ 2021-193591

(51) Int. Cl.
*H01Q 1/32* (2006.01)

(52) U.S. Cl.
CPC ................................ *H01Q 1/3275* (2013.01)

(58) Field of Classification Search
CPC ...... H01Q 1/32; H01Q 1/3275; H01Q 1/3291; H01Q 1/42; H01Q 21/28
See application file for complete search history.

(56) References Cited

U.S. PATENT DOCUMENTS

2020/0058988 A1 2/2020 Elshaar

FOREIGN PATENT DOCUMENTS

| | | | | | |
|---|---|---|---|---|---|
| CN | 212968021 | U | | 4/2021 | |
| JP | 2003-124719 | A | | 4/2003 | |
| JP | 2003133826 | A | * | 5/2003 | ............... H01Q 1/22 |
| JP | 2003-309409 | A | | 10/2003 | |
| JP | 2003-309410 | A | | 10/2003 | |
| JP | 2018149912 | A | * | 9/2018 | ............. B62D 25/20 |

* cited by examiner

*Primary Examiner* — Hoang V Nguyen
(74) *Attorney, Agent, or Firm* — Dinsmore & Shohl LLP

(57) ABSTRACT

A vehicle skeleton structure including: a roof reinforcement that configures a part of a roof section of a vehicle body, the roof reinforcement extending in a vehicle width direction, the roof reinforcement having a closed cross-sectional shape when viewed from the vehicle width direction, the roof reinforcement being configured such that a communication device capable of at least one of sending or receiving of radio waves can be disposed at an inner side thereof, and a penetrating section being formed at a portion at a vehicle upper side of the roof reinforcement; and a lid member that closes off the penetrating section, the lid member being configured by a material capable of transmitting radio waves.

9 Claims, 7 Drawing Sheets

VEHICLE SKELETON STRUCTURE

CROSS-REFERENCE TO RELATED APPLICATION

This application is based on and claims priority under 35 USC 119 from Japanese Patent Application No. 2021-193591 filed on Nov. 29, 2021, the disclosure of which is incorporated by reference herein.

BACKGROUND

Technical Field

The present disclosure relates to a vehicle skeleton structure.

Related Art

Japanese Patent Application Laid-Open (JP-A) No. 2003-309409 discloses an invention relating to a mounting structure of an embedded antenna for a vehicle. In this mounting structure of an embedded antenna for a vehicle, a concave portion is formed at a roof section or the like of a vehicle body, and an antenna (communication device) is housed in this concave portion.

However, it is considered that, when the concave portion is simply formed at the roof section of the vehicle body, rigidity of the vehicle body against rollover or the like of the vehicle is insufficient. Namely, in the related art described above, there is room for improvement in terms of ensuring rigidity of the vehicle body against rollover and the like, while ensuring space for disposing a communication device at the vehicle body.

SUMMARY

In consideration of the above facts, an object of the present disclosure is to obtain a vehicle skeleton structure that is capable of ensuring rigidity of a vehicle body against rollover and the like, while ensuring space for disposing a communication device at the vehicle body.

A vehicle skeleton structure according to a first aspect of the present disclosure includes: a roof reinforcement that configures a part of a roof section of a vehicle body, extends in a vehicle width direction, and has a closed cross-sectional shape when viewed from the vehicle width direction, the roof reinforcement being configured such that a communication device capable of at least one of sending or receiving of radio waves can be disposed at an inner side thereof, and a penetrating section being formed at a portion at a vehicle upper side of the roof reinforcement; and a lid member that closes off the penetrating section and that is configured by a material capable of transmitting radio waves.

According to the first aspect of the present disclosure, a part of the roof section of the vehicle body is configured by the roof reinforcement. The roof reinforcement is configured to be a closed cross-sectional structure that extends in the vehicle width direction and has a closed cross-sectional shape when viewed from the vehicle width direction. Accordingly, in the present disclosure, the roof section of the vehicle body can be reinforced against loads caused by rollover or the like, by the roof reinforcement.

Incidentally, from the viewpoint of space saving and the like, in some embodiments, a communication device that performs sending and receiving of radio waves may be incorporated into the roof section of the vehicle body. On the other hand, from the viewpoint of reinforcement of the roof section, in some embodiments, constituent elements of the roof section, such as the roof reinforcement and the like, may be configured by a steel material or the like, but the steel material cannot transmit the radio waves that the communication device sends and receives.

In this regard, in the present disclosure, the communication device can be disposed at the inner side of the roof reinforcement, and the penetrating section is formed at the portion at the vehicle upper side of the roof reinforcement and is closed off by the lid member configured by a material capable of transmitting radio waves.

Consequently, in the present disclosure, the communication device can be incorporated into the roof section of the vehicle body. Further, even if the roof reinforcement is configured by a steel material or the like, by transmitting radio waves through the penetrating section and the lid member, sending and receiving of radio waves by the communication device is enabled, while infiltration of rainwater or the like into the roof reinforcement from the penetrating section can be suppressed by the lid member.

The vehicle skeleton structure according to a second aspect of the present disclosure is the vehicle skeleton structure according to the first aspect, in which the penetrating section has a size that allows the communication device to pass therethrough, and a resin roof panel serving as the lid member and configuring a part of a design surface at a vehicle upper side of the roof section is disposed at a vehicle upper side of the penetrating section.

According to the second aspect of the present disclosure, the penetrating section provided at the roof reinforcement is configured to have a size that allows the communication device to pass therethrough, and the communication device can be disposed within the roof reinforcement from the penetrating section.

Further, the resin roof panel configuring a part of the design surface at the vehicle upper side of the roof section is disposed at the vehicle upper side of the penetrating section, and the penetrating section provided at the roof reinforcement can be hidden from the vehicle upper side while enabling sending and receiving of radio waves by the communication device.

The vehicle skeleton structure according to a third aspect of the present disclosure is the vehicle skeleton structure according to the first aspect, in which a plurality of penetrating sections through which the communication device cannot pass are formed at a portion of the roof reinforcement at a vehicle upper side thereof, and an installation hole section through which the communication device can pass is formed at a portion of the roof reinforcement at a vehicle lower side thereof.

According to the third aspect of the present disclosure, the plurality of penetrating sections through which the communication device cannot pass are formed at the portion of the roof reinforcement at the vehicle upper side thereof, and sending and receiving of radio waves by the communication device can be carried out due to the radio waves being transmitted through these penetrating sections.

Further, compared to a configuration in which a penetrating section having a size that allows the communication device to pass therethrough is formed at a portion of the roof reinforcement at the vehicle upper side thereof, it is possible to suppress local application of a load at a location where the penetrating section is not provided in the portion of the roof reinforcement at the vehicle upper side thereof.

Meanwhile, the installation hole section through which the communication device can pass is formed at the portion of the roof reinforcement at the vehicle lower side thereof, and the communication device can be disposed inside the roof reinforcement from the installation hole section.

The vehicle skeleton structure according to a fourth aspect of the present disclosure is the vehicle skeleton structure according to any one of the first to third aspects, in which a cylindrical section extending from the penetrating section toward a vehicle lower side is provided integrally with the roof reinforcement at a peripheral edge of the penetrating section.

According to the fourth aspect of the present disclosure, the cylindrical section, extending from the penetrating section toward the vehicle lower side, is provided integrally with the roof reinforcement at the peripheral edge of the penetrating section in the roof reinforcement. Consequently, in the present disclosure, infliction of injury to fingers or the like of a worker by the peripheral edge of the penetrating section at the time of assembly of the vehicle body, at the time of installation of the communication device, or the like, can be suppressed.

The vehicle skeleton structure according to a fifth aspect of the present disclosure is the vehicle skeleton structure according to any one of the first to fourth aspects, in which the roof reinforcement configures a part of the roof section at a vehicle rear side thereof.

According to the fifth aspect of the present disclosure, since the roof reinforcement configures a part of the roof section of the vehicle body at the vehicle rear side thereof, a sunroof or the like can be disposed at a portion or the like of the roof section at a vehicle front side thereof.

As described above, the vehicle skeleton structure according to the first aspect of the present disclosure has an effect in that rigidity of the vehicle body against rollover and the like can be ensured while ensuring space for disposing the communication device at the vehicle body.

The vehicle skeleton structure according to the second aspect of the present disclosure has an effect in that designability of the vehicle can be ensured while simplifying the installation work of the communication device.

The vehicle skeleton structure according to the third aspect of the present disclosure has an effect in that it is possible to suppress the occurrence of a stress concentration section at a portion of the roof section at a vehicle upper side thereof.

The vehicle skeleton structure according to the fourth aspect of the present disclosure has an effect in that efficiency of assembly work of the vehicle can be improved.

The vehicle skeleton structure according to the fifth aspect of the present disclosure has an effect in that a degree of freedom in vehicle body design can be secured.

BRIEF DESCRIPTION OF THE DRAWINGS

Exemplary embodiments of the present disclosure will be described in detail based on the following figures, wherein.

DETAILED DESCRIPTION

First Exemplary Embodiment

A first exemplary embodiment of a vehicle skeleton structure according to the present disclosure will be explained below, with reference to FIG. 1 to FIG. 5. It should be noted that an arrow FR illustrated as appropriate in the respective drawings indicates a vehicle front side of a "vehicle 10" to which the vehicle skeleton structure according to the present exemplary embodiment has been applied, an arrow UP indicates a vehicle upper side of the vehicle 10, and an arrow LH indicates a vehicle width direction left side of the vehicle 10.

Figure 2:
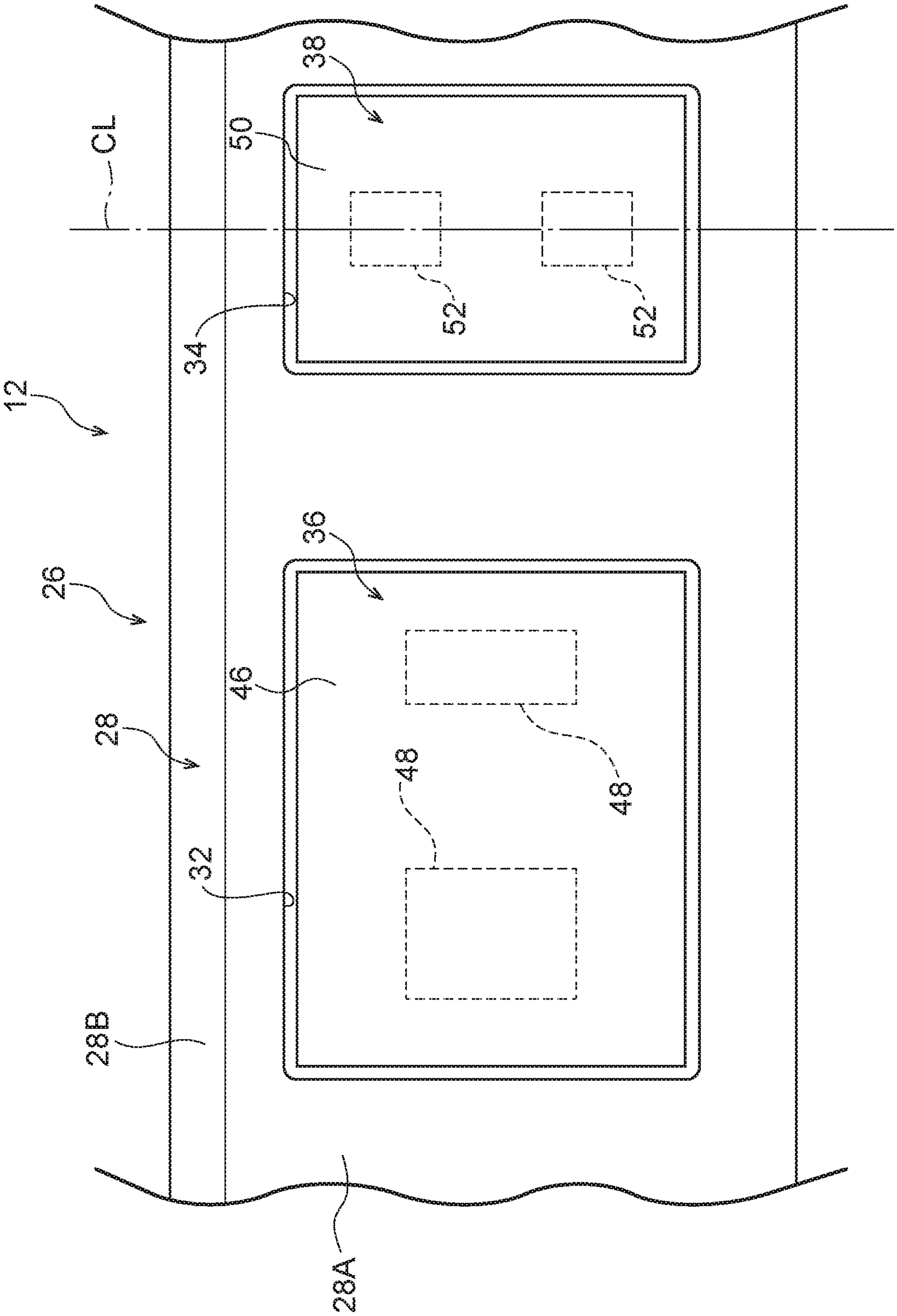
FIG. 2 is a plan view (view seen along a two-directional arrow in FIG. 3) schematically illustrating a configuration of a main part of a vehicle body to which the vehicle skeleton structure according to the first exemplary embodiment has been applied.
Figure 3:
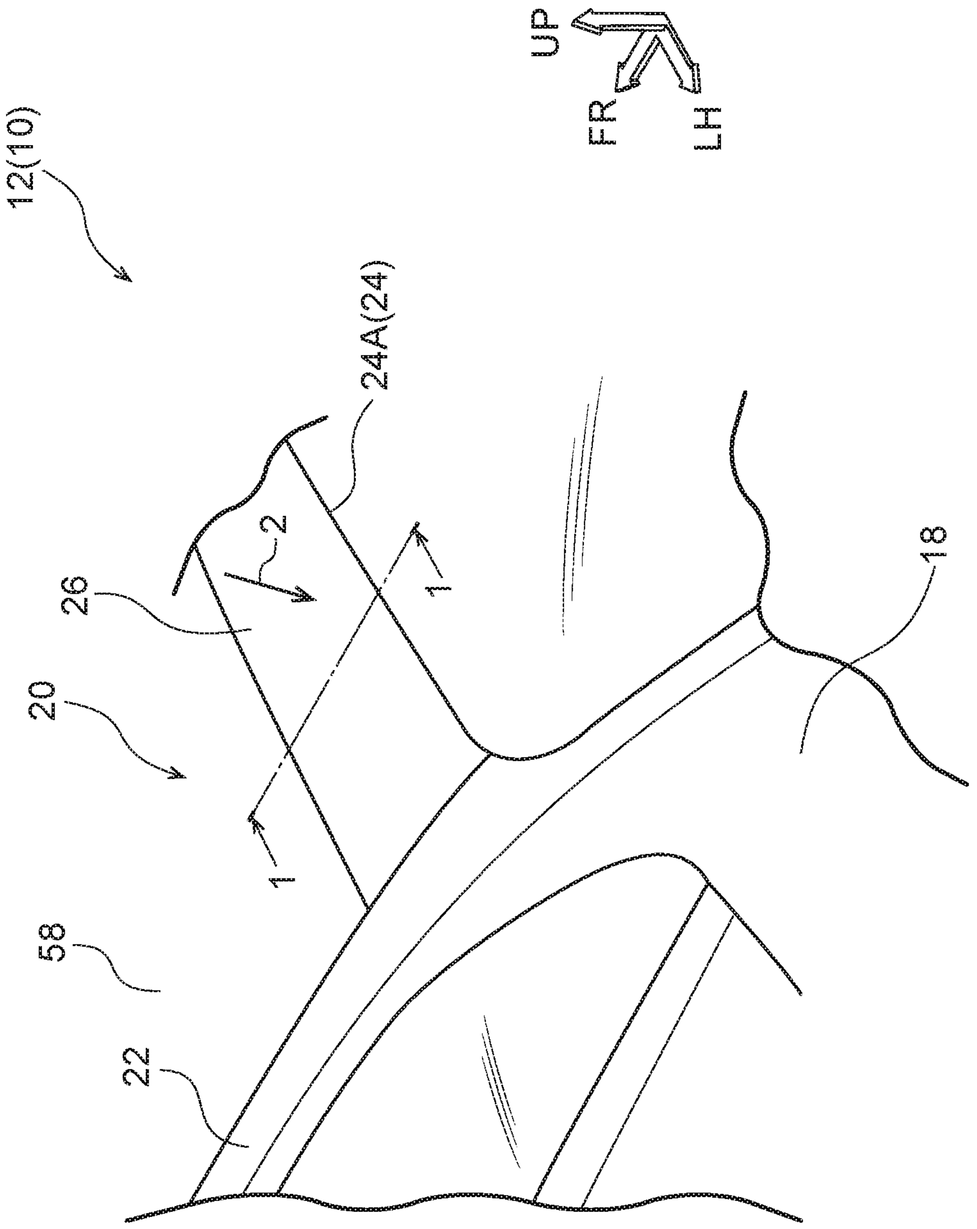
FIG. 3 is a perspective view schematically illustrating a configuration of a vehicle body to which the vehicle skeleton structure according to the first exemplary embodiment has been applied, viewed from a vehicle rear left side.

First, a schematic configuration of a "vehicle body 12" configuring a main portion of a vehicle cabin of the vehicle 10 will be explained, with reference to FIG. 3. The vehicle body 12 includes a pair of right and left front pillars 14 (refer to FIG. 4), a pair of right and left center pillars 16 (refer to FIG. 4), and a pair of right and left rear pillars 18, at vehicle width direction outer sides thereof. Upper ends of each of the front pillars 14, the center pillars 16, and the rear pillars 18 are connected by roof side rails 22 configuring a part of a "roof section 20" of the vehicle body 12. It should be noted that the vehicle body 12 is configured symmetrically with respect to a center line CL (refer to FIG. 2) extending in a vehicle front-rear direction.

Each roof side rail 22 extends in the vehicle front-rear direction and is configured to include an outer panel configuring a portion at a vehicle width direction outer side thereof and an inner panel configuring a portion at a vehicle width direction inner side thereof. The roof side rail 22 is configured to be a closed cross-sectional structure in which a cross-section viewed from the vehicle front-rear direction is a closed cross-section, due to the outer panel and the inner panel being joined at a non-illustrated joining section formed by spot welding or the like.

Further, portions of the pair of roof side rails 22 at vehicle rear sides thereof are connected by a "rear header reinforcement 26" serving as a roof reinforcement that extends in the vehicle width direction along an upper edge 24A of a back door opening 24.

The present exemplary embodiment is characterized by a configuration of the rear header reinforcement 26 and a peripheral portion thereof. The configuration of the rear header reinforcement 26 and the peripheral portion thereof will be explained in detail below.

Figure 1:
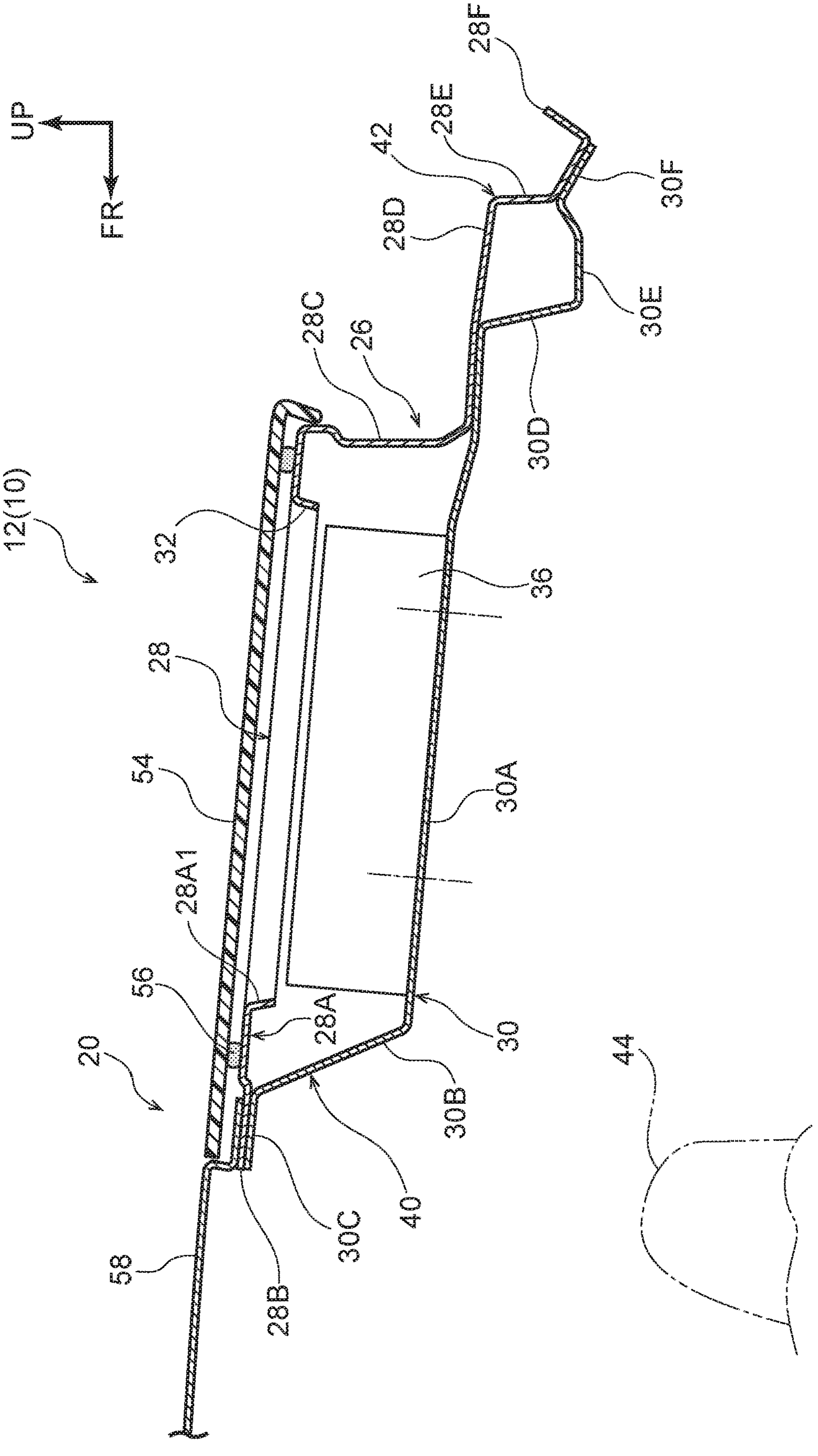
FIG. 1 is a cross-sectional view (cross-sectional view illustrating a state sectioned along a line 1-1 in FIG. 3) schematically illustrating a configuration of a main part of a vehicle body to which a vehicle skeleton structure according to a first exemplary embodiment has been applied.

As illustrated in FIG. 1, the rear header reinforcement 26 is configured to include an upper panel 28 configuring a portion at a vehicle upper side thereof and a lower panel 30 configuring a portion at a vehicle lower side thereof, and these are formed by pressing steel plates.

The upper panel 28 is configured to include a first upper wall section 28A, a first upper side extending wall section 28B, a first upper side vertical wall section 28C, a second upper wall section 28D, a second upper side vertical wall section 28E, and a second upper side extending wall section 28F.

The first upper wall section 28A configures a main portion of the upper panel 28 and extends in the vehicle width direction and the vehicle front-rear direction with a plate thickness direction thereof being a vehicle up-down direction. Furthermore, as illustrated in FIG. 2, the first upper wall section 28A is provided with a pair of "penetrating sections 32" and a "penetrating section 34". Each penetrating section 32 is formed at a portion at a vehicle width direction outer side of the first upper wall section 28A and is configured to have a rectangular shape with a longitudinal direction thereof being the vehicle width direction as viewed from the vehicle up-down direction. Further, an "antenna unit 36" serving as a communication device, which is to be described later, is accommodated at an inner side of the penetrating section 32 as viewed from the vehicle up-down direction. Namely, a size of the penetrating section 32 is a size that allows the antenna unit 36 to pass therethrough.

Furthermore, a "cylindrical section 28A1" extending from the penetrating section 34 toward the vehicle lower side is provided integrally with the first upper wall section 28A at a peripheral edge of the penetrating section 32, by carrying out burring.

On the other hand, the penetrating section 34 is formed at a vehicle width direction center portion of the first upper wall section 28A and is configured to have a rectangular shape with a longitudinal direction thereof being the vehicle front-rear direction as viewed from the vehicle up-down direction. It should be noted that a length of the penetrating section 34 in the vehicle front-rear direction is set to be approximately the same as a length of the penetrating section 32 in the vehicle front-rear direction, and that a length of the penetrating section 34 in the vehicle width direction is set to be shorter than a length of the penetrating section 32 in the vehicle width direction.

Furthermore, an "antenna unit 38" serving as a communication device, which is to be described later, is accommodated at an inner side of the penetrating section 34 as viewed from the vehicle up-down direction. Namely, a size of the penetrating section 34 is a size that allows the antenna unit 38 to pass therethrough. It should be noted that a peripheral edge of the penetrating section 34 is subjected to burring in a similar manner as the penetrating section 32, and that a non-illustrated cylindrical section extending from the penetrating section 32 toward the vehicle lower side is provided integrally with the first upper wall section 28A at the peripheral edge.

The first upper side extending wall section 28B extends from a peripheral edge at a vehicle front side of the first upper wall section 28A toward the vehicle front side with a plate thickness direction thereof being the vehicle up-down direction.

On the other hand, the first upper side vertical wall section 28C extends from a peripheral edge at a vehicle rear side of the first upper wall section 28A toward the vehicle lower side with a plate thickness direction thereof being the vehicle front-rear direction, and the second upper wall section 28D extends from a peripheral edge at a vehicle lower side of the first upper side vertical wall section 28C toward the vehicle rear side with a plate thickness direction thereof being the vehicle up-down direction.

Furthermore, the second upper side vertical wall section 28E extends from a peripheral edge at a vehicle rear side of the second upper wall section 28D toward the vehicle lower side with a plate thickness direction thereof being the vehicle front-rear direction, and the second upper side extending wall section 28F extends from a peripheral edge at a vehicle lower side of the second upper side vertical wall section 28E toward a vehicle rearward and downward side. It should be noted that a portion at a vehicle rear side of the second upper side extending wall section 28F extends toward the vehicle upper side, and that a non-illustrated weather strip is attached to this portion.

On the other hand, the lower panel 30 is configured to include a first lower wall section 30A, a first lower side vertical wall section 30B, a first lower side extending wall section 30C, a second lower side vertical wall section 30D, a second lower wall section 30E, and a second lower side extending wall section 30F.

The first lower wall section 30A configures a main portion of the lower panel 30 and extends in the vehicle width direction and the vehicle front-rear direction with a plate thickness direction thereof being the vehicle up-down direction. The first lower wall section 30A is disposed so that a majority of the first lower wall section 30A overlaps with the first upper wall section 28A when viewed from the vehicle up-down direction. Further, a portion at a vehicle rear side of the first lower wall section 30A is joined to a portion at a vehicle front side of the second upper wall section 28D by a non-illustrated joining section formed by spot welding or the like. Furthermore, as described later, the antenna unit 36 and the antenna unit 38 are attached to the first lower wall section 30A.

The first lower side vertical wall section 30B extends from a peripheral edge at a vehicle front side of the first lower wall section 30A toward a vehicle frontward and upward side, and the first lower side extending wall section 30C extends from a peripheral edge at a vehicle upper side of the first lower side vertical wall section 30B toward the vehicle front side with a plate thickness direction thereof being the vehicle up-down direction. Furthermore, the first lower side extending wall section 30C is joined to the first upper side extending wall section 28B by a non-illustrated joining section formed by spot welding or the like.

On the other hand, the second lower side vertical wall section 30D extends from a peripheral edge at a vehicle rear side of the first lower wall section 30A toward the vehicle lower side with a plate thickness direction thereof being the vehicle front-rear direction, and the second lower wall section 30E extends from a peripheral edge at a vehicle lower side of the second lower side vertical wall section 30D toward the vehicle rear side with a plate thickness direction thereof being the vehicle up-down direction.

Furthermore, the second lower side extending wall section 30F extends from a peripheral edge at a vehicle rear side of the second lower wall section 30E toward a vehicle rearward and downward side, and the second lower side extending wall section 30F is joined to a portion at a vehicle front side of the second upper side extending wall section 28F by a non-illustrated joining section formed by spot welding or the like.

The rear header reinforcement 26 configured as described above includes a first closed cross-sectional structure section 40 configured by the first upper wall section 28A, the first upper side vertical wall section 28C, the first lower wall section 30A, and the first lower side vertical wall section 30B, and a second closed cross-sectional structure section 42 configured by the second upper wall section 28D, the second upper side vertical wall section 28E, the second lower side vertical wall section 30D, and the second lower wall section 30E.

The first closed cross-sectional structure section 40 extends in the vehicle width direction, a shape of the first closed cross-sectional structure section 40 viewed from the vehicle width direction is a closed cross-sectional shape, and a portion at a vehicle rear side of the roof section 20 is reinforced by the first closed cross-sectional structure section 40. Further, a rear seat 44 is disposed at a vehicle lower side of the first closed cross-sectional structure section 40.

On the other hand, the second closed cross-sectional structure section 42 extends in the vehicle width direction, a shape of the second closed cross-sectional structure section 42 viewed from the vehicle width direction is a closed cross-sectional shape that is smaller than a cross-section of the first closed cross-sectional structure section 40, and the upper edge 24A of the back door opening 24 is reinforced by the second closed cross-sectional structure section 42.

Further, the antenna unit 36 and the antenna unit 38 are disposed at an inner side the first closed cross-sectional structure section 40. As illustrated in FIG. 2, the antenna unit 36 includes a case 46 configuring an outer shell thereof and configured by a material such as a resin or the like that is capable of transmitting radio waves, and a plurality of antennas 48 that are capable of at least one of sending or receiving of radio waves and that are stored in the case 46.

Furthermore, the antenna unit 36 is attached to the first lower wall section 30A by a non-illustrated attachment member in a state in which the antenna unit 36 is mounted on the first lower wall section 30A of the lower panel 30.

On the other hand, the antenna unit 38 includes a case 50 configuring an outer shell thereof and configured by a material such as a resin or the like that is capable of transmitting radio waves, and a plurality of antennas 52 that are capable of at least one of sending or receiving of radio waves and that are stored in the case 50.

It should be noted that examples of types of the antennas 48 and the antennas 52 include an antenna for a data communication module (DCM), an antenna for a global positioning system (GPS), an antenna for a wireless local area network (LAN), an antenna for electronic toll collection (ETC), and the like.

Meanwhile, a "resin roof panel 54" serving as a lid member is disposed at a vehicle upper side of the first closed cross-sectional structure section 40. The resin roof panel 54 is configured by a resin such as a polycarbonate or the like that is capable of transmitting radio waves, and is configured to have a plate shape that covers the first closed cross-sectional structure section 40 as viewed from the vehicle up-down direction. Furthermore, the resin roof panel 54 is joined to the upper panel 28 by a joining section 56 formed by an adhesive or the like provided so as to surround the penetrating section 32 as viewed from the vehicle up-down direction. It should be noted that an upper surface of the resin roof panel 54 is coated with a paint and constitutes a part of a design surface at a vehicle upper side of the roof section 20.

Further, a roof panel 58 formed by pressing a steel plate is disposed at a vehicle front side of the resin roof panel 54, and the roof panel 58, together with the resin roof panel 54, constitute a part of the design surface at the vehicle upper side of the roof section 20. It should be noted that a peripheral edge at a vehicle rear side of the roof panel 58 is joined to the first upper side extending wall section 28B of the upper panel 28 by a non-illustrated joining section formed by spot welding or the like. Further, a non-illustrated seal member is attached to a boundary portion between the resin roof panel 54 and the roof panel 58.

Operation and Effects of Present Exemplary Embodiment

Next, operation and effects of the present exemplary embodiment will be explained.

In the present exemplary embodiment, as illustrated in FIG. 1, a part of the roof section 20 of the vehicle body 12 is configured by the rear header reinforcement 26. The rear header reinforcement 26 is configured to be a closed cross-sectional structure that extends in the vehicle width direction and has a closed cross-sectional shape when viewed from the vehicle width direction. Accordingly, in the present exemplary embodiment, the roof section 20 of the vehicle body 12 can be reinforced against loads caused by rollover or the like, by the rear header reinforcement 26.

Incidentally, from the viewpoint of space saving and the like, in some embodiments, a communication device that performs sending and receiving of radio waves may be incorporated into the roof section 20 of the vehicle body 12. On the other hand, from the viewpoint of reinforcement of the roof section 20, in some embodiments, constituent elements of the roof section 20, such as the rear header reinforcement 26 and the like, may be configured by a steel material or the like, but the steel material cannot transmit the radio waves that the communication device sends and receives.

In this regard, in the present exemplary embodiment, as also illustrated in FIG. 2, the antenna unit 36 and the antenna unit 38 can be disposed at the inner side of the rear header reinforcement 26, and the penetrating section 32 and the penetrating section 34 are formed at the portion at the vehicle upper side of the rear header reinforcement 26 and are closed off by the resin roof panel 54 configured by a material capable of transmitting radio waves.

Consequently, in the present exemplary embodiment, the antenna unit 36 and the antenna unit 38 can be incorporated into the roof section 20 of the vehicle body 12. Further, even if the rear header reinforcement 26 is configured by a steel material or the like, by transmitting radio waves through the penetrating section 32, the penetrating section 34, and the resin roof panel 54, sending and receiving of radio waves by the antenna unit 36 and the antenna unit 38 is enabled, while infiltration of rainwater or the like into the rear header reinforcement 26 from the penetrating section 32 and the penetrating section 34 can be suppressed by the resin roof panel 54.

Accordingly, in the present exemplary embodiment, rigidity of the vehicle body 12 against rollover and the like can be ensured while ensuring space for disposing the antenna unit 36 and the antenna unit 38 at the vehicle body 12.

Further, in the present exemplary embodiment, as described above, the antenna unit 36 and the antenna unit 38 can be disposed within the rear header reinforcement 26. This enables a clearance from a head of a non-illustrated occupant seated at the rear seat 44 to the roof section 20 to be enlarged, in comparison to a configuration in which the antenna unit 36 and the antenna unit 38 are disposed at a vehicle lower side of the rear header reinforcement 26.

Further, in the present exemplary embodiment, the penetrating section 32 provided at the rear header reinforcement

26 is configured to have a size that allows the antenna unit 36 to pass therethrough, and the penetrating section 34 is configured to have a size that allows the antenna unit 38 to pass therethrough. Consequently, in the present exemplary embodiment, the antenna unit 36 and the antenna unit 38 can be respectively disposed within the rear header reinforcement 26 from the penetrating section 32 and the penetrating section 34, respectively.

Furthermore, the resin roof panel 54 configuring a part of the design surface at the vehicle upper side of the roof section 20 is disposed at a vehicle upper side of the penetrating section 32 and the penetrating section 34, and the penetrating section 32 and the penetrating section 34 provided at the rear header reinforcement 26 can be hidden from the vehicle upper side while enabling sending and receiving of radio waves by the antenna unit 36 and the antenna unit 38. Accordingly, in the present exemplary embodiment, designability of the vehicle 10 can be ensured while simplifying the installation work of the antenna unit 36 and the antenna unit 38.

Further, in the present exemplary embodiment, the cylindrical section 28A1, extending from the penetrating section 32 toward the vehicle lower side, is provided integrally with the rear header reinforcement 26 at a peripheral edge of the penetrating section 32 in the rear header reinforcement 26. Furthermore, a cylindrical section is also provided at a peripheral edge of the penetrating section 34, similarly to the penetrating section 32.

Consequently, in the present exemplary embodiment, infliction of injury to fingers or the like of a worker by the peripheral edges of the penetrating section 32 and the penetrating section 34 at the time of assembly of the vehicle body 12, at the time of installation of the antenna unit 36 and the antenna unit 38, or the like, can be suppressed, and as a result, efficiency of assembly work of the vehicle 10 can be improved.

Further, in the present exemplary embodiment, by providing the cylindrical section at the peripheral edge of the penetrating section in the upper panel 28, a cross-sectional area of a cross-section of the rear header reinforcement 26 as viewed from the vehicle width direction can be increased. Furthermore, by forming the cylindrical section by burring, work-hardening occurs at the cylindrical section and a peripheral portion thereof. As a result, in the present exemplary embodiment, strength of the rear header reinforcement 26 and rigidity against loads caused by rollover or the like can be improved.

In addition, in the present exemplary embodiment, since the rear header reinforcement 26 configures a part of the roof section 20 of the vehicle body 12 at a vehicle rear side thereof, a sunroof or the like can be disposed at a portion or the like of the roof section 20 at a vehicle front side thereof. Accordingly, in the present exemplary embodiment, a degree of freedom in vehicle body design can be secured.

Modified Example of First Exemplary Embodiment

Figure 4:
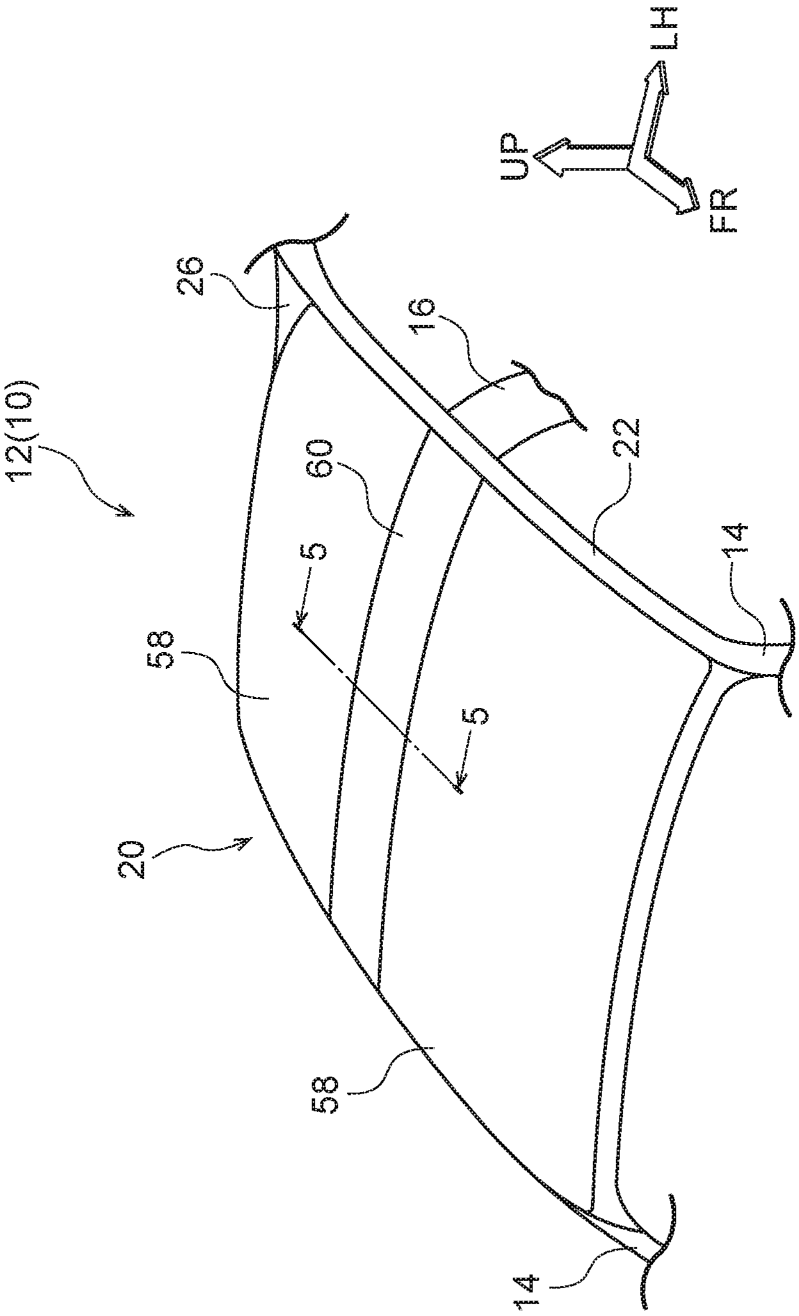
FIG. 4 is a perspective view schematically illustrating a configuration of a vehicle body to which the vehicle skeleton structure according to a modified example of the first exemplary embodiment has been applied, viewed from a vehicle front left side.
Figure 5:
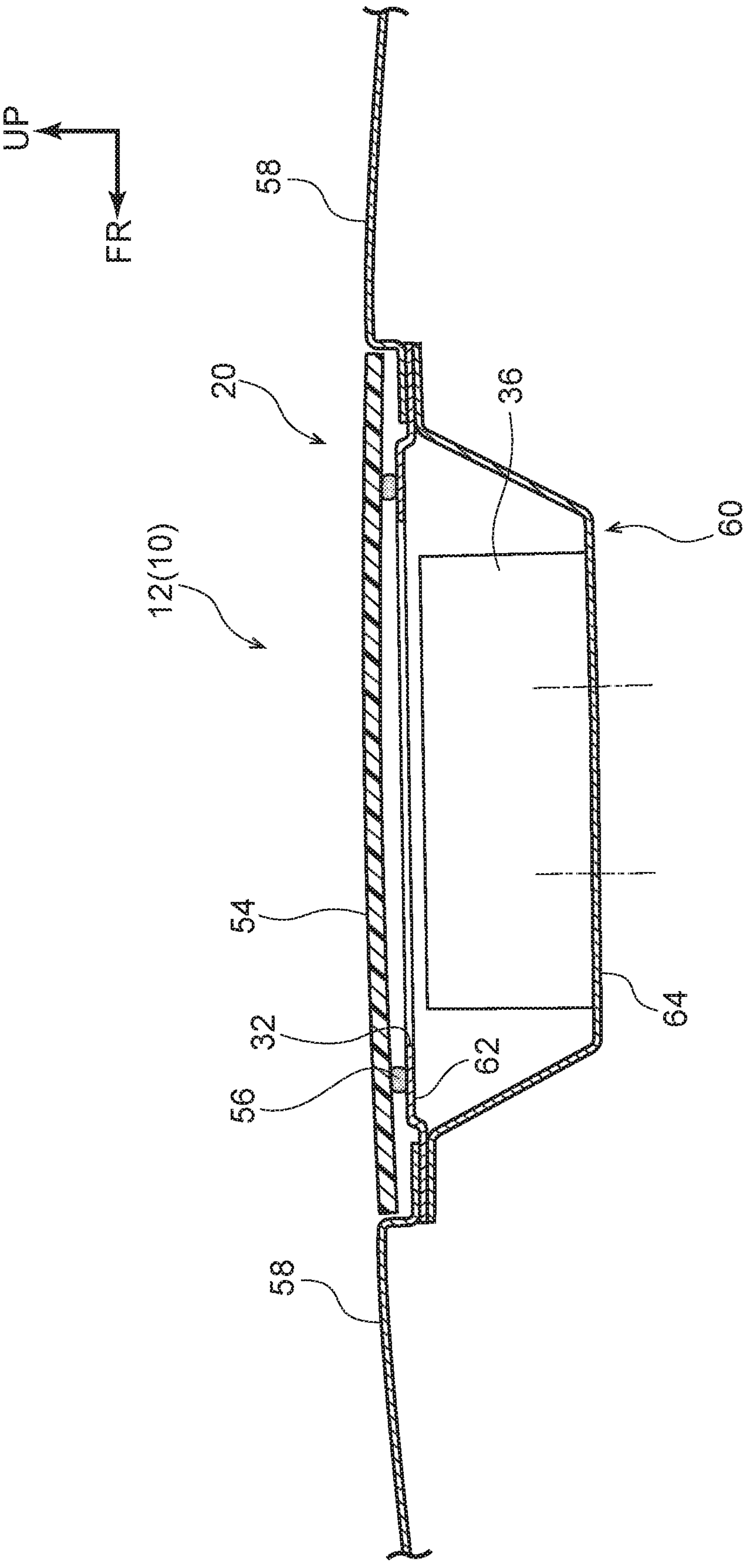
FIG. 5 is a cross-sectional view (cross-sectional view illustrating a state sectioned along a line 5-5 in FIG. 4) schematically illustrating a configuration of a main part of a vehicle body to which the vehicle skeleton structure according to a modified example of the first exemplary embodiment has been applied.

Next, a modified example of the first exemplary embodiment will be explained with reference to FIG. 4 and FIG. 5. Although the antenna unit 36 and the antenna unit 38 are disposed within the rear header reinforcement 26 in the first exemplary embodiment described above, the antenna unit 36 and the antenna unit 38 may be disposed within a "center header reinforcement 60" serving as a roof reinforcement that connects vehicle front-rear direction center portions of the pair of roof side rails 22.

More specifically, the center header reinforcement 60 is configured to include an upper panel 62 configuring a portion at a vehicle upper side thereof and a lower panel 64 configuring a portion at a vehicle lower side thereof, and these are formed by pressing steel plates.

The upper panel 62 extends in the vehicle width direction and the vehicle front-rear direction with a plate thickness direction thereof being the vehicle up-down direction and is provided with the penetrating section 32 and the penetrating section 34 similarly to the upper panel 28.

On the other hand, the lower panel 64 is hat-shaped with a cross-sectional shape, as viewed from the vehicle width direction, that is open to the vehicle upper side, and extends in the vehicle width direction. Furthermore, the upper panel 62 and the lower panel 64 are joined together by a non-illustrated joining section formed by spot welding or the like, whereby the center header reinforcement 60 is configured to be a closed cross-sectional structure that has a closed cross-sectional shape when viewed from the vehicle width direction.

It should be noted that the antenna unit 36 and the antenna unit 38 are attached to the lower panel 64 by non-illustrated attachment members in a state in which the antenna unit 36 and the antenna unit 38 are mounted on the lower panel 64. Further, similarly to the first exemplary embodiment described above, a resin roof panel 54 is attached to a vehicle upper side of the center header reinforcement 60.

According to such a configuration, basically the same effects as those of the first exemplary embodiment described above are achieved even in a case in which the antenna unit 36 and the antenna unit 38 cannot be disposed at the rear header reinforcement 26 due to specifications or the like of the vehicle 10.

Further, in a case in which the antenna unit 36 and the antenna unit 38 can be disposed at the rear header reinforcement 26, more space in which communication devices can be disposed can be ensured at the vehicle body 12, enabling more communication devices to be installed at the vehicle body 12.

Second Exemplary Embodiment

Figure 6:
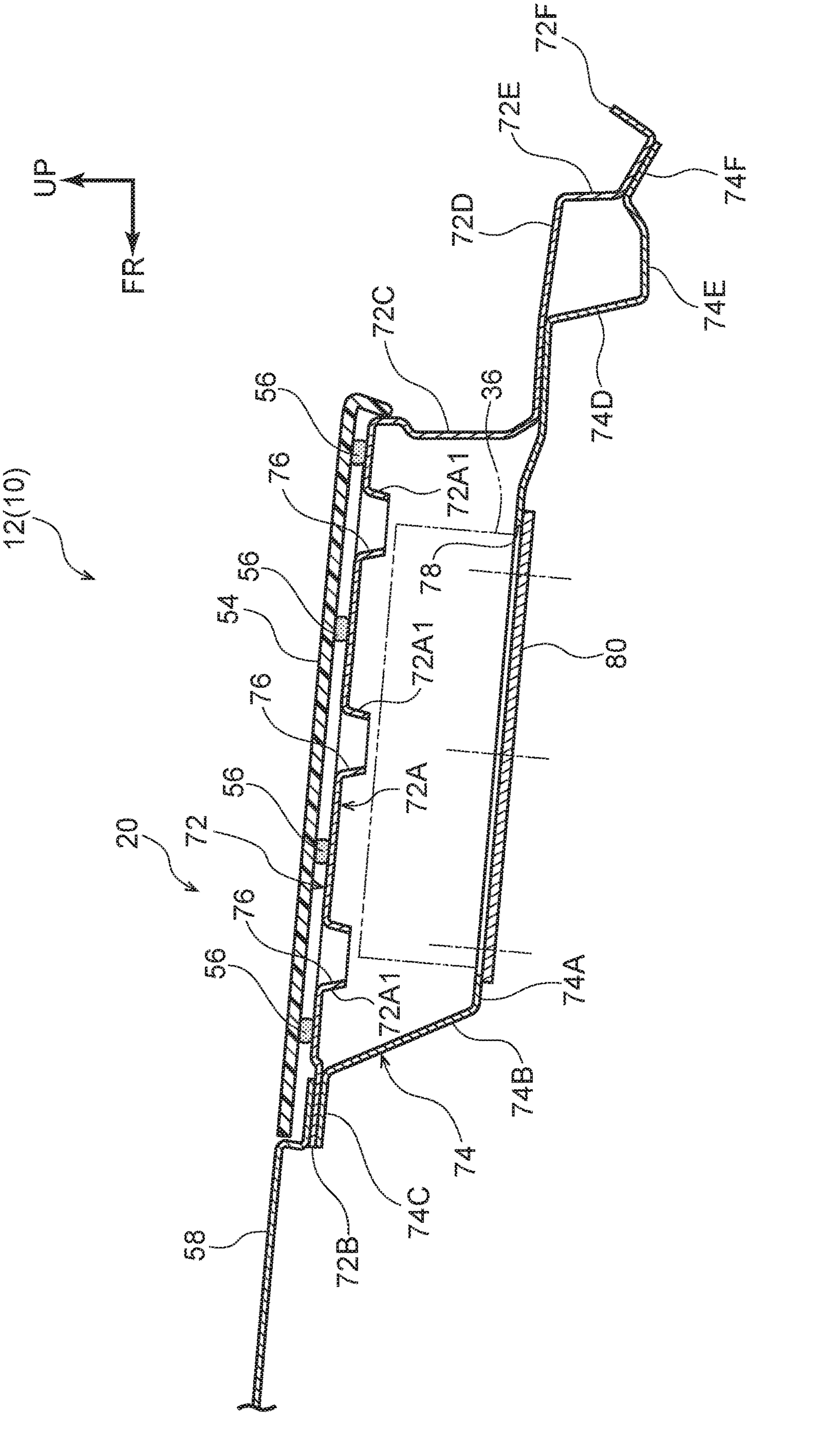
FIG. 6 is a cross-sectional view (cross-sectional view illustrating a state sectioned along a line 6-6 in FIG. 7) schematically illustrating a configuration of a main part of a vehicle body to which a vehicle skeleton structure according to a second exemplary embodiment has been applied.
Figure 7:
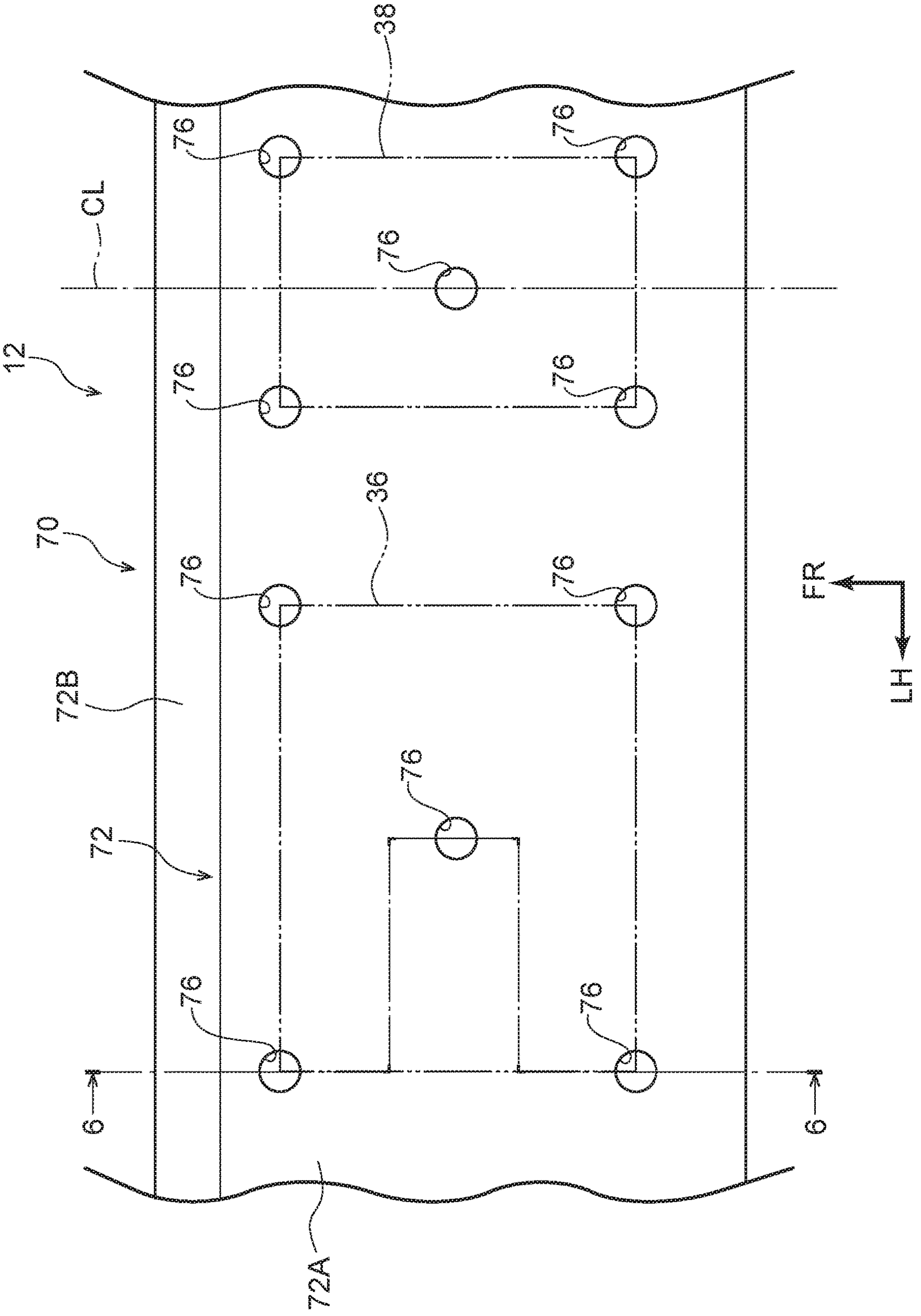
FIG. 7 is a plan view schematically illustrating a configuration of a main part of a vehicle body to which the vehicle skeleton structure according to the second exemplary embodiment has been applied.

A vehicle skeleton structure according to a second exemplary embodiment of the present disclosure will be explained below, with reference to FIG. 6 and FIG. 7. It should be noted that the same reference numerals are allocated to components that are the same as those of the first exemplary embodiment described above, and that explanation thereof is omitted.

Although the present exemplary embodiment is basically configured similarly to the first exemplary embodiment described above, a configuration of a "rear header reinforcement 70" serving as a roof reinforcement differs from the first exemplary embodiment.

More specifically, the rear header reinforcement 70 includes an upper panel 72 configuring a portion at a vehicle upper side thereof and a lower panel 74 configuring a portion at a vehicle lower side thereof. Similarly to the upper panel 28, the upper panel 72 is configured to include a first upper wall section 72A, a first upper side extending wall section 72B, a first upper side vertical wall section 72C, a second upper wall section 72D, a second upper side vertical wall section 72E, and a second upper side extending wall section 72F.

Furthermore, in the present exemplary embodiment, a plurality of "penetrating sections 76" through which neither of the antenna unit 36 and the antenna unit 38 can pass are formed at the first upper wall section 72A. These penetrating sections 76 are respectively configured to be circular when viewed from the vehicle up-down direction, and are disposed so as to overlap with at least one of the antenna unit 36 or the antenna unit 38, and at predetermined intervals in the vehicle width direction and in the vehicle front-rear direction.

Further, "cylindrical sections 72A1" respectively extending from the penetrating sections 76 toward the vehicle lower side are provided integrally with the first upper wall section 72A at peripheral edges of the penetrating sections 76, by carrying out burring.

Meanwhile, similarly to the lower panel 30, the lower panel 74 is configured to include a first lower wall section 74A, a first lower side vertical wall section 74B, a first lower side extending wall section 74C, a second lower side vertical wall section 74D, a second lower wall section 74E, and a second lower side extending wall section 74F.

Furthermore, in the present exemplary embodiment, an "installation hole section 78" through which the antenna unit 36 can pass, and a non-illustrated installation hole section through which the antenna unit 38 can pass, are provided at the first lower wall section 74A.

Meanwhile, a base plate 80 is attached to a vehicle lower side of the antenna unit 36. Furthermore, the base plate 80 is attached to the first lower wall section 74A from the vehicle lower side by a non-illustrated attachment member in a state in which the antenna unit 36 is inserted from the installation hole section 78 to an inner side of the rear header reinforcement 70, whereby the antenna unit 36 is fixed to the rear header reinforcement 70. It should be noted that the antenna unit 38 is also fixed to the rear header reinforcement 70, similarly to the antenna unit 36.

Further, in the present exemplary embodiment, joining sections 56 that join the resin roof panel 54 to the rear header reinforcement 70 are provided with respect to the respective penetrating sections 76 so as to surround the respective penetrating sections 76 when viewed from the vehicle up-down direction.

Since the present exemplary embodiment configured in this manner is basically configured similarly to the first exemplary embodiment described above, the same operation and effects as those of the first exemplary embodiment are achieved.

Further, in the present exemplary embodiment, the plurality of penetrating sections 76 through which neither of the antenna unit 36 and the antenna unit 38 can pass are formed at a portion of the rear header reinforcement 70 at a vehicle upper side thereof, and sending and receiving of radio waves by the antenna unit 36 and the antenna unit 38 can be carried out due to the radio waves being transmitted through these penetrating sections 76.

Furthermore, compared to a configuration in which a penetrating section having a size that allows the antenna unit 36 or the antenna unit 38 to pass therethrough is formed at a portion of the rear header reinforcement 70 at the vehicle upper side thereof, it is possible to suppress local application of a load at a location where the penetrating section is not provided in the portion of the rear header reinforcement 70 at the vehicle upper side thereof.

Meanwhile, the installation hole section 78 through which the antenna unit 36 can pass and the installation hole section through which the antenna unit 38 can pass are formed at a portion of the rear header reinforcement 70 at a vehicle lower side thereof, and the antenna unit 36 and the antenna unit 38 can be disposed inside the rear header reinforcement 70 from these installation hole sections. Accordingly, in the present exemplary embodiment, it is possible to suppress the occurrence of a stress concentration section at a portion of the roof section 20 at a vehicle upper side thereof.

Supplementary Explanation of the Exemplary Embodiments (1) In the exemplary embodiments described above, although the rear header reinforcement 26, the center header reinforcement 60, and the rear header reinforcement 70 are configured from steel plates, these may be configured from carbon fiber reinforced resin according to the specifications or the like of the vehicle 10.

(2) Further, in the exemplary embodiments described above, although the cylindrical sections are formed at the peripheries of the penetrating sections of the rear header reinforcement by burring, a configuration in which cylindrical sections are not provided at peripheries of the penetrating sections may be adopted in accordance with the specifications or the like of the vehicle 10.

(3) In addition, in the exemplary embodiments described above, although the penetrating sections provided at the portion at the vehicle upper side of the roof reinforcement are covered by the resin roof panel, the member that closes off the penetrating sections is not limited thereto. For example, according to the specifications or the like of the vehicle 10, a configuration may be adopted in which a lid member having a shape that enables only the penetrating sections to be closed of by a material that is capable of transmitting radio waves is formed, and the lid member is fitted to the penetrating sections. Further, depending on the sizes of the penetrating sections provided at the portion at the vehicle upper side of the roof reinforcement, a configuration may also be adopted in which a sealing material made of a material that is capable of transmitting radio waves is filled into the penetrating sections and used as the lid member.

What is claimed is:

1. A vehicle skeleton structure comprising:

a roof reinforcement that configures a part of a roof section of a vehicle body, the roof reinforcement extending in a vehicle width direction, the roof reinforcement having a closed cross-sectional shape when viewed from the vehicle width direction, the roof reinforcement being configured such that a communication device capable of at least one of sending or receiving of radio waves can be disposed at an inner side thereof, and a penetrating section being formed at a portion at a vehicle upper side of the roof reinforcement, the roof reinforcement including:

an upper panel including:

an upper wall section that extends in the vehicle width direction and a vehicle front-rear direction; and a lower panel positioned below the communication device;

a lid member positioned above the upper panel that closes off the penetrating section, the lid member being configured by a material capable of transmitting radio waves; and a cylindrical section extending from the penetrating section toward a vehicle lower side that is provided integrally with the roof reinforcement at a peripheral edge of the penetrating section, wherein the cylindrical section includes a proximate end connected to the upper wall section at a peripheral edge of the penetrating section, and an opposite distal end, and wherein the cylindrical section extends linearly from the proximate end to the distal end towards a vehicle lower side.

2. The vehicle skeleton structure of claim 1, wherein:

the penetrating section has a size that allows the communication device to pass therethrough, and a resin roof panel serving as the lid member and configuring a part of a design surface at a vehicle upper side of the roof section is disposed at a vehicle upper side of the penetrating section.

3. The vehicle skeleton structure of claim 1, wherein:

a plurality of penetrating sections through which the communication device cannot pass are formed at a portion of the roof reinforcement at a vehicle upper side thereof, and an installation hole section through which the communication device can pass is formed at a portion of the roof reinforcement at a vehicle lower side thereof.

4. The vehicle skeleton structure of claim 1, wherein the roof reinforcement configures a part of the roof section at a vehicle rear side thereof.

5. The vehicle skeleton structure of claim 1, wherein:

the upper panel includes a first upper side extending section, a first upper side vertical wall section, a second upper wall section, a second upper side vertical wall section, a second upper side extending wall section, and the lower panel includes a first lower wall section, a first lower side vertical wall section, a first lower side extending wall section, a second lower side vertical wall section, a second lower wall section, and a second lower side extending wall section.

6. The vehicle skeleton structure of claim 5, wherein the roof reinforcement includes:

a first closed cross-sectional structure section configured by the upper wall section, the first upper side vertical wall section, the first lower wall section, and the first lower side vertical wall section; and a second closed cross-sectional structure section configured by the second upper wall section, the second upper side vertical wall section, the second lower side vertical wall section, and the second lower wall section.

7. The vehicle skeleton structure of claim 6, wherein:

the first closed cross-sectional structure section extends in the vehicle width direction, and a shape of the first closed cross-sectional structure section viewed from the vehicle width direction is a closed cross-sectional shape, and the second closed cross-sectional structure section extends in the vehicle width direction, and a shape of the second closed cross-sectional structure section viewed from the vehicle width direction is a closed cross-sectional shape that is smaller than a cross-section of the first closed cross-sectional structure section.

8. The vehicle skeleton structure of claim 7, wherein the second closed cross-sectional structure section is disposed on a vehicle rear side relative to the first closed cross-sectional structure section.

9. The vehicle skeleton structure of claim 7, wherein the communication device is disposed at an inner side of the first closed cross-sectional structure section.

* * * * *